United States Patent
Blumenfeld

(10) Patent No.: US 9,772,120 B2
(45) Date of Patent: Sep. 26, 2017

(54) CENTRAL SOLAR WATER HEATER SYSTEM (CSWHS) FOR A TYPICAL FLOOR IN MULTI-STORY BUILDING

(71) Applicant: Moshe Blumenfeld, Beer Sheva (IL)

(72) Inventor: Moshe Blumenfeld, Beer Sheva (IL)

(*) Notice: Subject to any disclaimer, the term of this patent is extended or adjusted under 35 U.S.C. 154(b) by 428 days.

(21) Appl. No.: 14/508,948

(22) Filed: Oct. 7, 2014

(65) Prior Publication Data

US 2015/0096554 A1    Apr. 9, 2015

Related U.S. Application Data

(60) Provisional application No. 61/961,173, filed on Oct. 7, 2013.

(51) Int. Cl.

| | | |
|---|---|---|
| *F24J 2/04* | (2006.01) | |
| *F24J 2/26* | (2006.01) | |
| *F24D 11/00* | (2006.01) | |
| *F24D 19/10* | (2006.01) | |

(52) U.S. Cl.
CPC .......... *F24J 2/0444* (2013.01); *F24D 11/003* (2013.01); *F24D 19/1042* (2013.01); *F24J 2/265* (2013.01); *Y02B 10/20* (2013.01); *Y02E 10/44* (2013.01)

(58) Field of Classification Search
CPC ... F24D 19/1042; F24D 11/003; F24J 2/0444; F24J 2/265; Y02B 10/20; Y02E 10/44
See application file for complete search history.

(56) References Cited

U.S. PATENT DOCUMENTS

| | | | |
|---|---|---|---|
| 2,575,478 A | 11/1951 | Wilson | |
| 3,517,151 A * | 6/1970 | Mekjean | F24H 7/0433 219/618 |
| 4,085,731 A | 4/1978 | Weir | |
| 4,283,914 A | 8/1981 | Allen | |
| 4,338,917 A | 7/1982 | Keller | |
| 5,217,000 A | 6/1993 | Pierce-Bjorklund | |
| 2005/0022871 A1 * | 2/2005 | Acker | E03B 7/04 137/337 |
| 2008/0209907 A1 | 9/2008 | Xiao | |
| 2011/0108018 A1 | 5/2011 | Heinsohn et al. | |

FOREIGN PATENT DOCUMENTS

| | | |
|---|---|---|
| CN | 101319821 | 12/2008 |
| CN | 100582587 | 1/2010 |
| CN | 202393022 | 8/2012 |

OTHER PUBLICATIONS

International Search Report and Written Opinion—PCT/US2014/59567—Dec. 17, 2014.

* cited by examiner

*Primary Examiner* — Alfred Basichas

(57) ABSTRACT

Systems and methods for solar fluid heating in a multi-story building. A system in accordance with an aspect of the present disclosure includes solar collectors installed in solar-facing walls of the multi-story building, in which fluid receives thermal energy from the solar collectors. The system also includes fluid storage vessels. The system further includes a circulating pump coupled to the solar collectors to circulate the heated fluid between the solar collectors and the fluid storage vessels on a floor of the multi-story building.

22 Claims, 19 Drawing Sheets

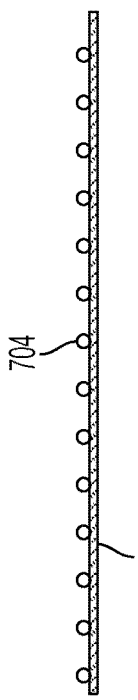
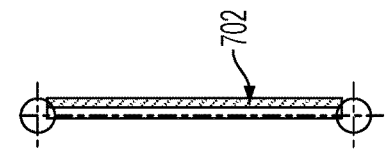
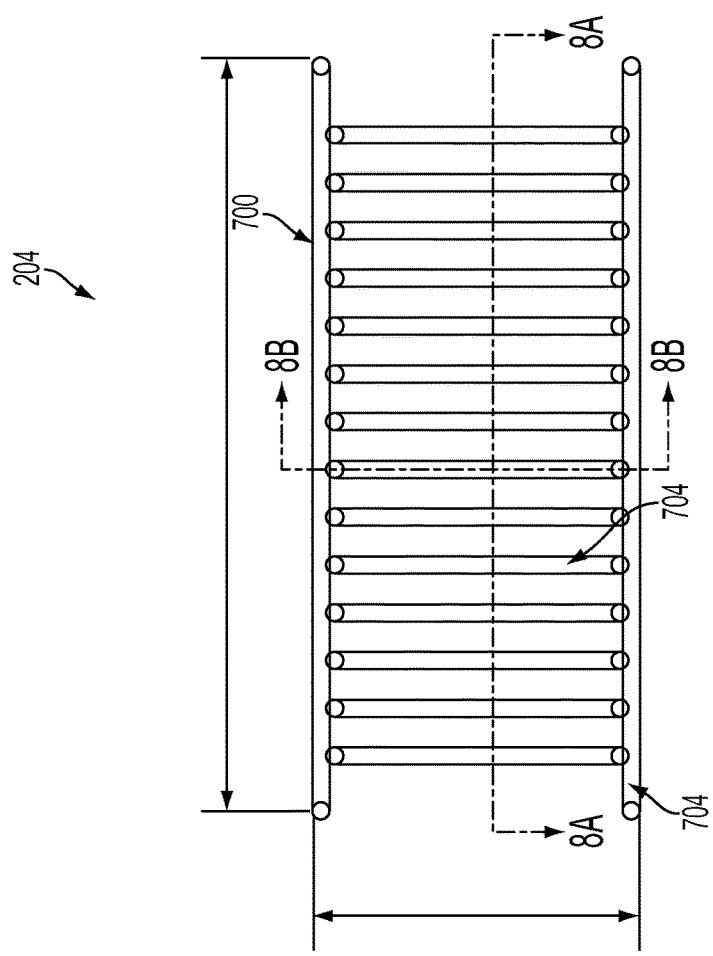
FIG. 8A
FIG. 8B
FIG. 8

CENTRAL SOLAR WATER HEATER SYSTEM (CSWHS) FOR A TYPICAL FLOOR IN MULTI-STORY BUILDING

CROSS-REFERENCE TO RELATED APPLICATION

This application claims the benefit under 35 U.S.C. §119 (e) to U.S. Provisional Patent Application No. 61/961,173, entitled "CENTRAL SOLAR WATER HEATER SYSTEM FOR A TYPICAL FLOOR IN MULTI-STORES BUILDING," filed on Oct. 7, 2013, the disclosure of which is expressly incorporated by reference herein in its entirety.

BACKGROUND

Field

Aspects of the present disclosure relate to solar heating, and more particularly to solar water heating in residential multi-story buildings.

Background

The industry of solar water heating is more than fifty years old. Existing solar water heating systems are not suitable for high buildings because the roof area per apartment diminishes proportionally as the number of floors increase, and the distance between the solar collectors and the storage hot water vessels increase proportionally as the number of floors increase.

These two reasons diminish the efficiency of solar water heating with systems based on solar collectors positioned on the roof of multi-story buildings.

SUMMARY

A system for solar fluid heating in a multi-story building may include solar collectors installed in solar-facing walls of the multi-story building, in which fluid receives thermal energy from the plurality of solar collectors. Such a system also includes fluid storage vessels. The system further includes a circulating pump coupled to the solar collectors to circulate the heated fluid between the solar collectors and the fluid storage vessels on a floor of the multi-story building.

A method for solar fluid heating in a multi-story building may include receiving solar energy at solar collectors installed in solar-facing walls of the multi-story building. Such a method further includes transferring the solar energy as thermal energy through a heating fluid. The method also includes circulating the heated fluid between the solar collectors and fluid storage vessels on a floor of the multi-story building.

An apparatus for solar fluid heating in a multi-story building includes means for receiving thermal energy installed in solar-facing walls of the multi-story building, in which fluid receives a solar energy from the plurality of solar collectors. Such an apparatus also includes means for transferring the solar energy as thermal energy through a heating fluid. The apparatus also includes means for circulating the heated fluid between the solar collectors and fluid storage vessels on a floor of the multi-story building.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 8 illustrates a detailed view of a second type of solar collector in accordance with an aspect of the present disclosure.

DETAILED DESCRIPTION

Figure 1A:
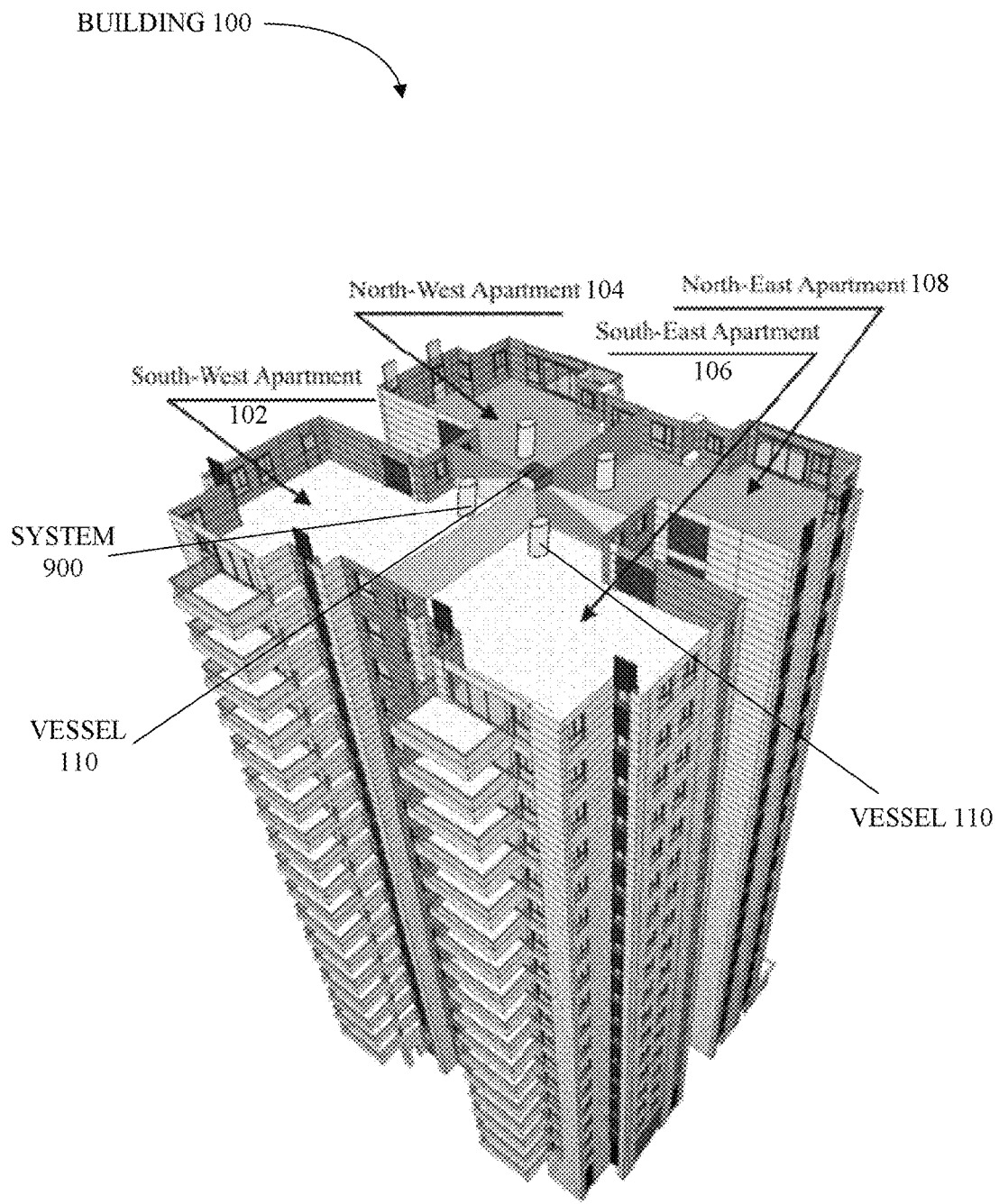
FIG. 1A illustrates a building with solar panels of the related art.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

In multi-story buildings, the roof area per apartment diminishes proportionally as the number of floors increase. In addition, the distance between any solar collectors and any storage hot water vessels increase proportionally as the number of floors increase in a multi-story building. These two reasons diminish the efficiency of heating water by solar energy in multi-story buildings that use solar water heating systems in which the solar collectors are positioned on the roof of the multi-story buildings.

In multi-story buildings, however, the surface area of the external walls (East, South and West) exposed to solar radiation remains constant for each particular floor. As a result, the amount of solar radiation for heating the buildings increases proportionally as the number of floors increase. For example, in many parts of the world, walls facing or partially facing the sun (i.e. all walls except North in the Northern Hemisphere and South in the Southern Hemisphere) get sufficient sunlight for residential water heating throughout most of the year.

One aspects of the present disclosure provides a system that overcomes the limitations of current technologies by enabling an independent supply of solar heated hot water to each floor in a multi-story building. This is achieved by a special design of mini central systems that collect the solar energy arriving to the external walls of each floor of any multi stores residential towers building, and stores it in each particular hot water storage vessel, fitted per apartment. This may be achieved by a special design of mini-central systems that collect the solar energy arriving to the external walls of each floor of any multi-story building (e.g., residential towers). This solar energy may be stored by fitting each particular apartment with its own hot water storage vessel. This configuration provides an even sharing of the solar energy arriving to the external walls (e.g., East, South and West walls) of a typical floor, to produce abundant hot water solar heating to all the apartments in each respective floor.

Accordingly, aspects of the present disclosure employ an increase of the surface area of the external walls that are exposed to solar radiation in multi-story buildings. A system for solar water heating in a multi-story building in accordance with an aspect of the present disclosure includes solar collectors installed in solar-facing (e.g., vertical) walls of the multi-story building, in which water receives thermal energy from the solar collectors. The system also includes a plurality of water vessels. The system also includes a circulating pump coupled to the plurality of solar collectors to circulate the water between the solar collectors and the plurality of water vessels on a floor of the multi-story building to enable an independent supply of solar heated hot water to each floor in, for example, a high rise building. For example, an aspect of the present disclosure enables residents of any particular floor in a multi-story building with an individual solar heated hot water solution. This solution can be integrated into any particular architecture with solar exposed external walls and with minimal interference to the appearance of the existing building.

Because a multi-story building is a modular stacking of typical floors, aspects of the present disclosure may provide these types of buildings with a practical solution for abundant hot water heated by solar energy. For example, Empirical data shows that typical hot water storage vessels achieve specified temperature after two (2) or to five (5) hours, depending upon the hot water use during the previous day and the season of the year. In addition, the twelve (12) to fifteen (15) hours of day light gives the system a potential for electric production by using this extra hot water supply. This electric production may reduce the energy consumption of the building by a substantial amount.

FIG. 1A illustrates a three-dimensional view of a multi-story building having multiple apartments on each floor in accordance with an aspect of the present disclosure. A Building 100 has multiple stories, and on each story, may have several rooms or apartments. As shown in FIG. 1A, each floor of the building 100 may have four apartments, although a larger or smaller number of apartments or rooms are envisioned as within the scope of the present disclosure.

The building 100 can be oriented in any direction. As shown in FIG. 1A, however, there can be a southwest apartment 102, a northwest apartment 104, a southeast apartment 106 and a northeast apartment 108. In each of the apartments (e.g., 102-108), a hot water storage vessel (e.g., 110) is located for the storage of hot water. A system 900 (FIG. 9-11) is coupled to each of the hot water storage vessels 110 on the floor. The system 900 circulates a heating fluid, which may be water, oil, or other fluid or material, that can transfer thermal and/or electrical energy from the system 900 to one of the hot water storage vessels 110.

Figure 1B:
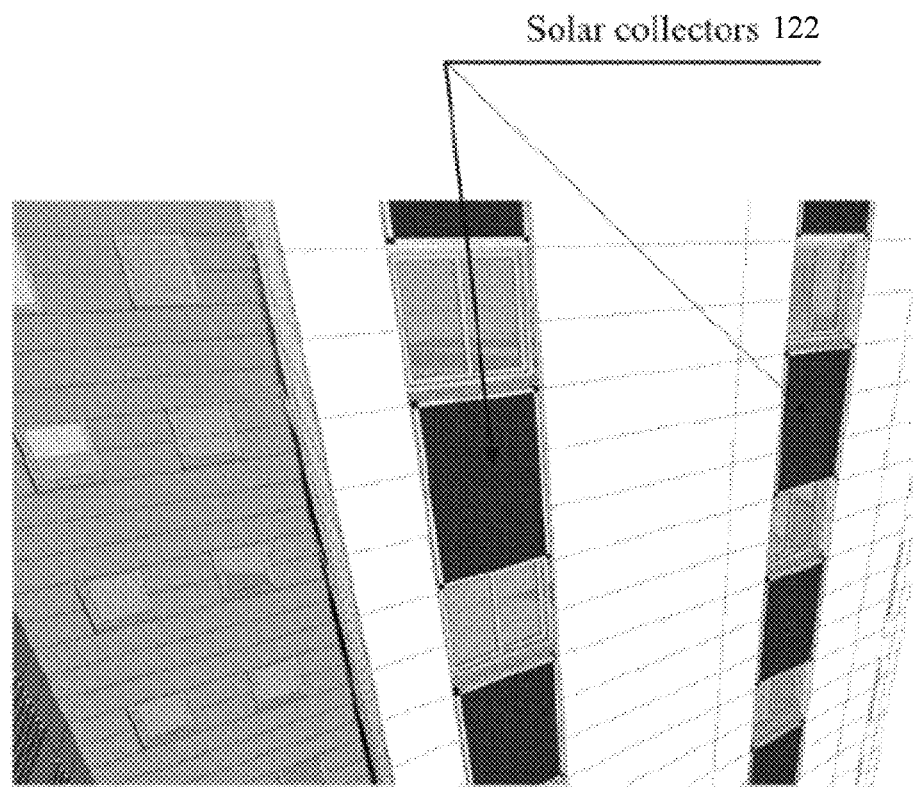
FIG. 1B illustrates a close up view of the solar collectors for a northeast apartment in accordance with an aspect of the present disclosure.
Figure 1C:
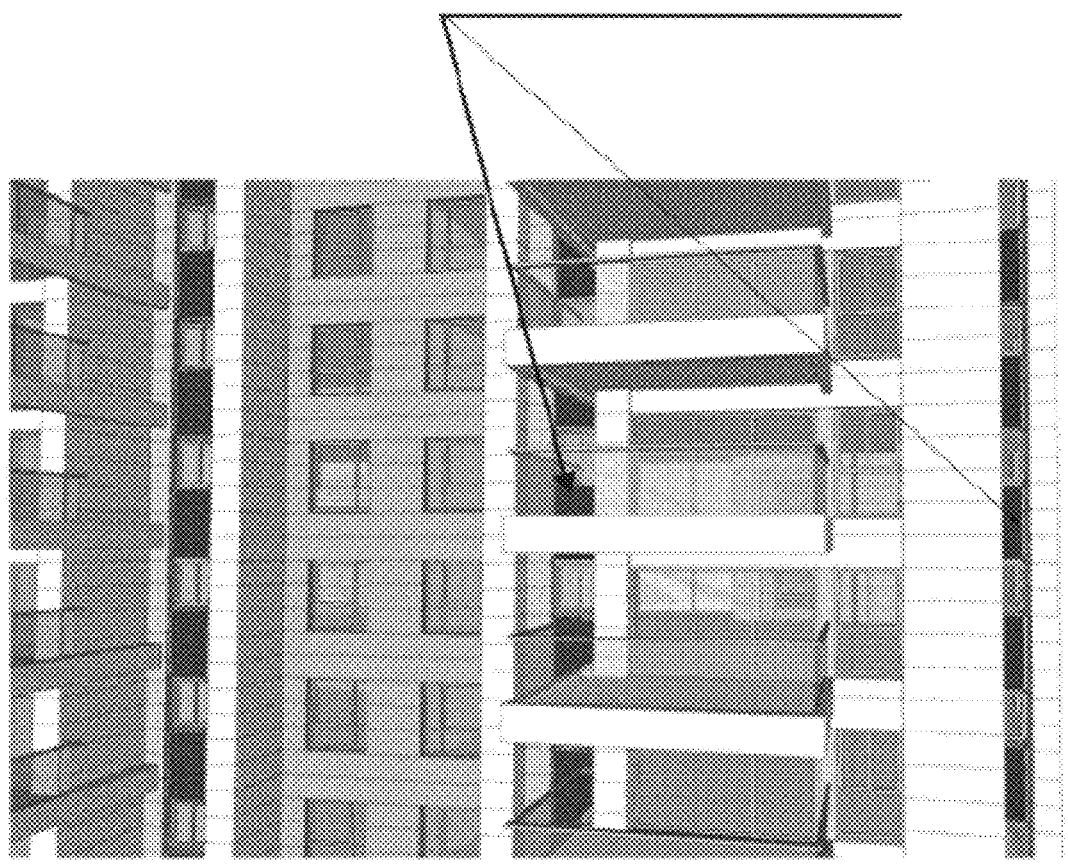
FIG. 1C illustrates a close up view of the solar collectors for a southeast apartment in accordance with an aspect of the present disclosure.
Figure 1D:
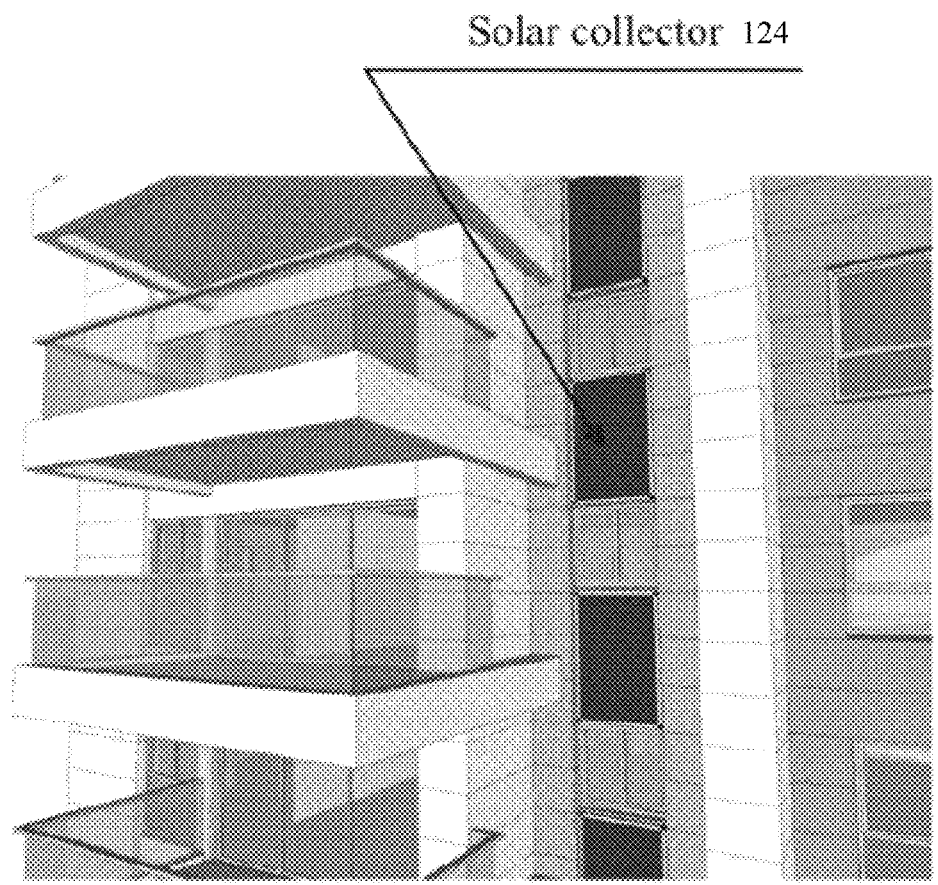
FIGS. 1D and 1E illustrate a close up view of the solar collectors for a southwest apartment in accordance with an aspect of the present disclosure.
Figure 1E:
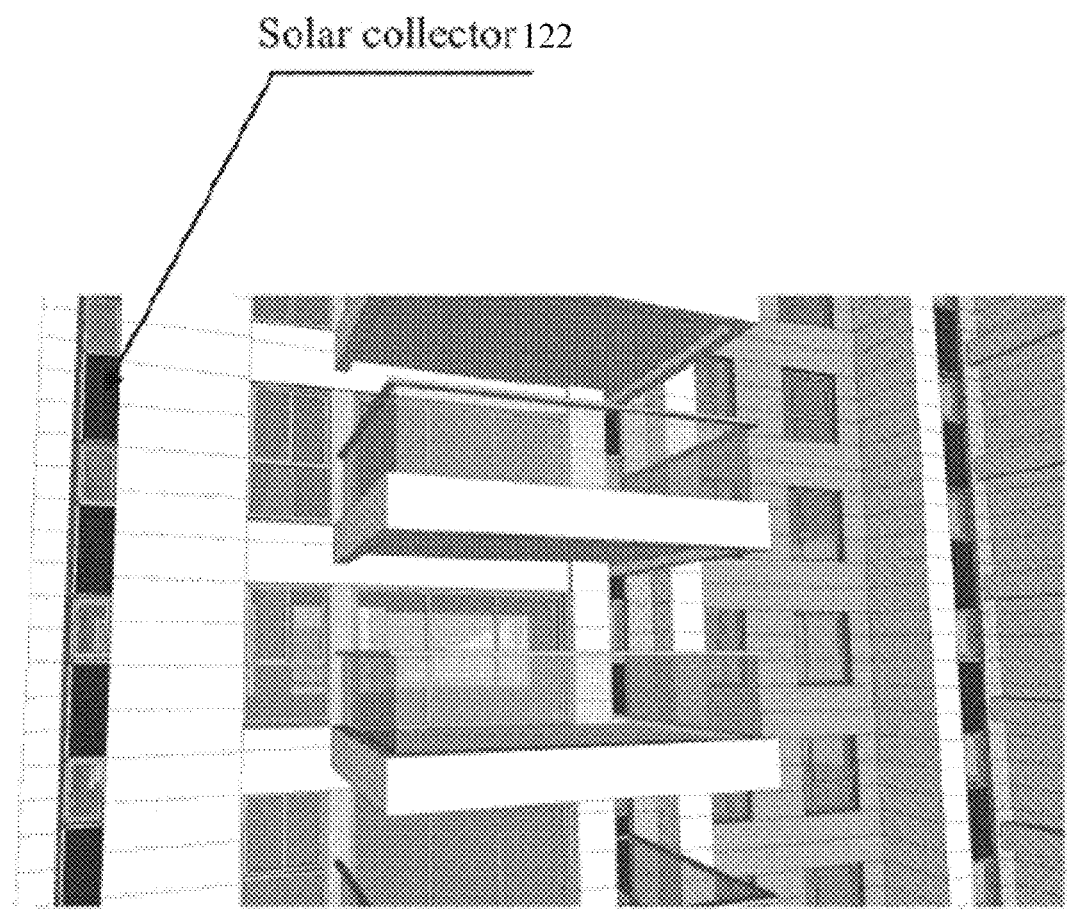
Figure 1F:
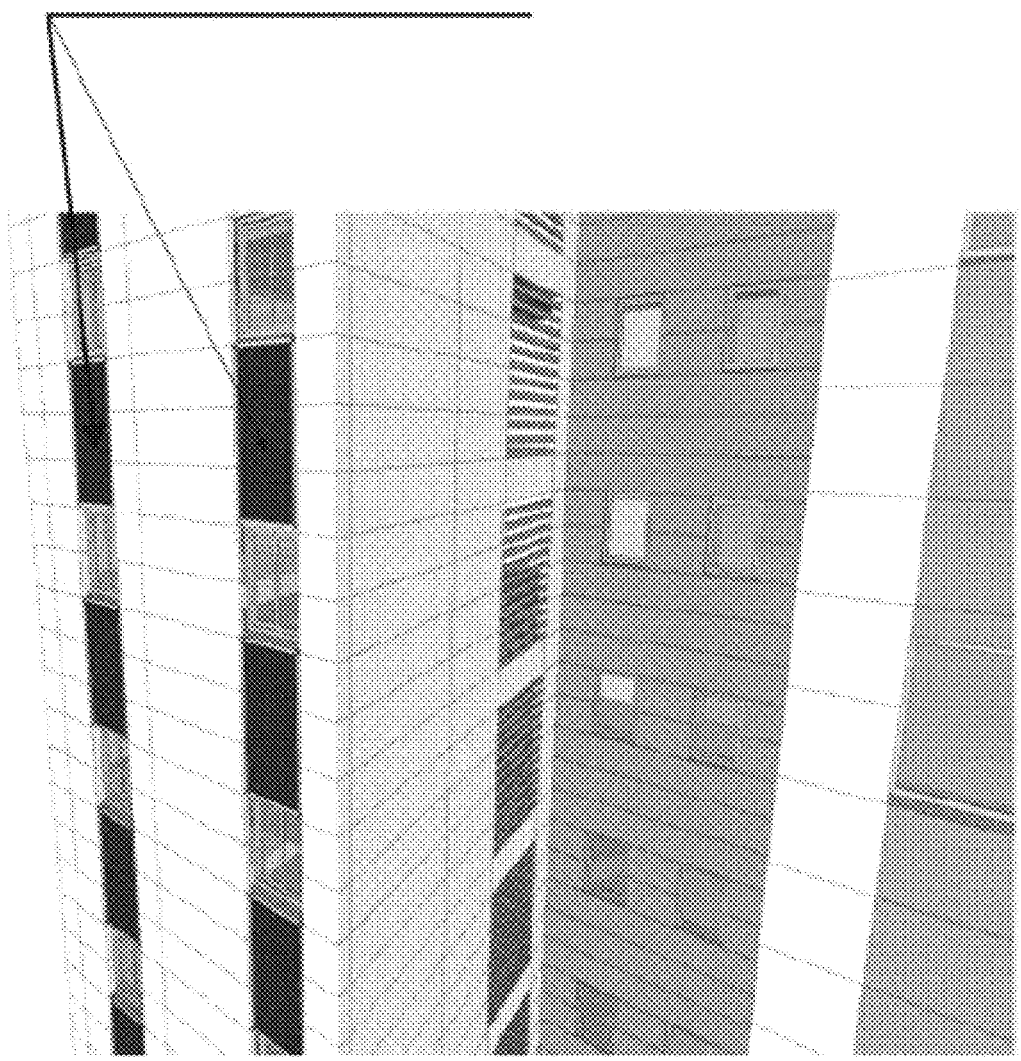
FIG. 1F illustrates a close up view of the solar collectors for a northwest apartment in accordance with an aspect of the present disclosure.

FIG. 1B illustrates a close up view of the solar collectors for a northeast apartment in accordance with an aspect of the present disclosure. The northeast apartment(s) 108 may provide solar energy to the system 900 for a certain amount of time, depending on the geographical location of the building 100. For example, and not by way of limitation, the northeast apartment 112 on a given floor of the building 100 may provide energy to the system 900 from sun rise to approximately 10:00 AM. Other ones of the solar collectors 122 may not be receiving solar energy and thus cannot provide energy to the system 900 during this period of time.

Figure 1G:
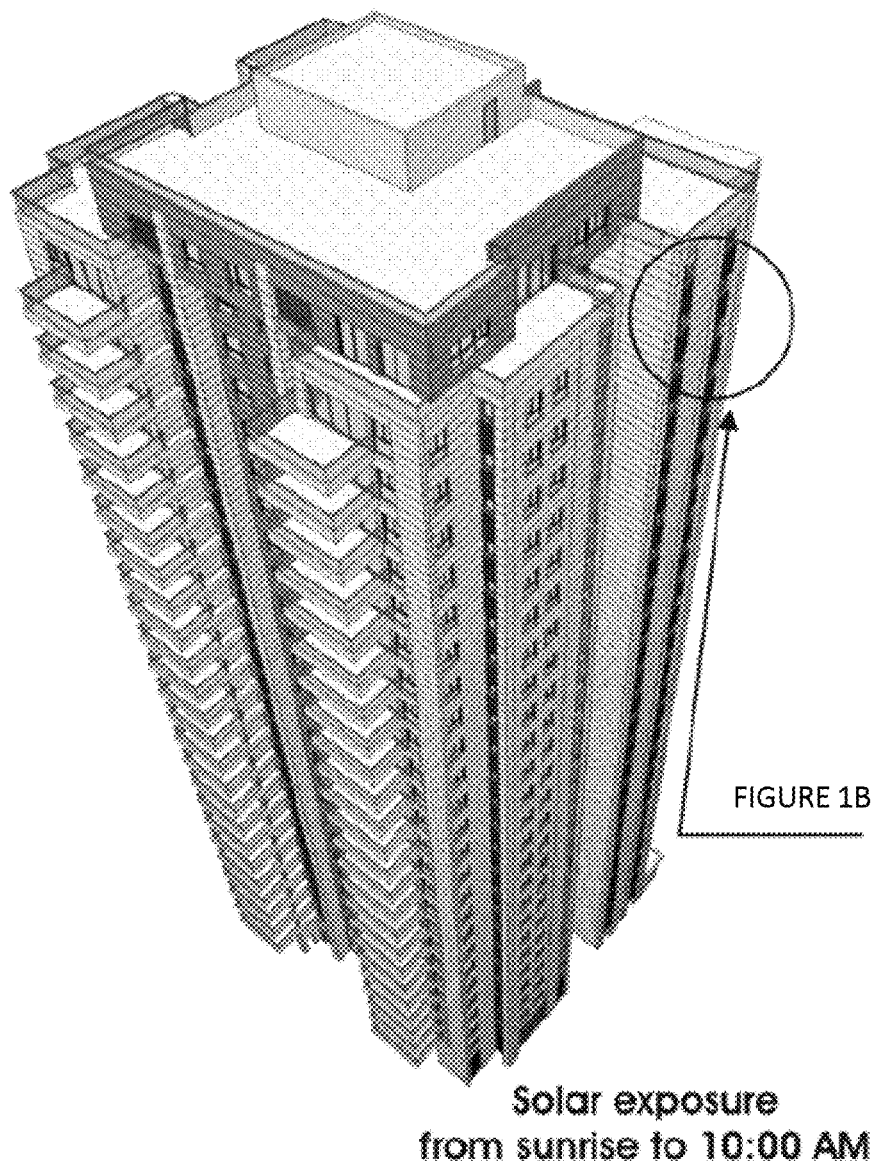
FIG. 1G illustrates an expanded view of the solar collectors of FIG. 1B in accordance with an aspect of the present disclosure.

FIGS. 1C to 1F illustrate close up views of the solar collectors 124 for a southeast apartment 106 (FIG. 1C), a southwest apartment 102 (FIGS. 1D and 1E), and a northwest apartment 104 (FIG. 1F) in accordance with aspects of the present disclosure. As with the northeast apartment(s) 108 shown in FIG. 1B, the solar collectors 122 and/or 124 of the apartments (e.g., 102-106) may provide solar energy to the system 900 for a certain amount of time, depending on the geographical location of the building 100. For example, and not by way of limitation, the solar collectors 124 may provide energy to the system from 10:00 AM to approximately 2:00 PM. The times that the solar collectors 122 and 124 may overlap each other, or may not overlap, based on the orientation of the building 100 and/or the overall design of the system 900. Other ones of the solar collectors 122 and/or 124 may not be receiving solar energy and thus cannot provide energy to the system 900 during this period of time. FIG. 1G illustrates an expanded view of the solar collectors 122 of FIG. 1B.

For the apartments (e.g., 102-108) that receive solar energy during some portion of the day, these apartments are fitted with solar collectors 122 and/or 124 in an external wall belonging to the particular apartment. So long as the solar collectors 122 and/or 124 receive solar radiation for some appreciable time during the day, these solar collectors may provide energy to the system 900.

Figure 9:
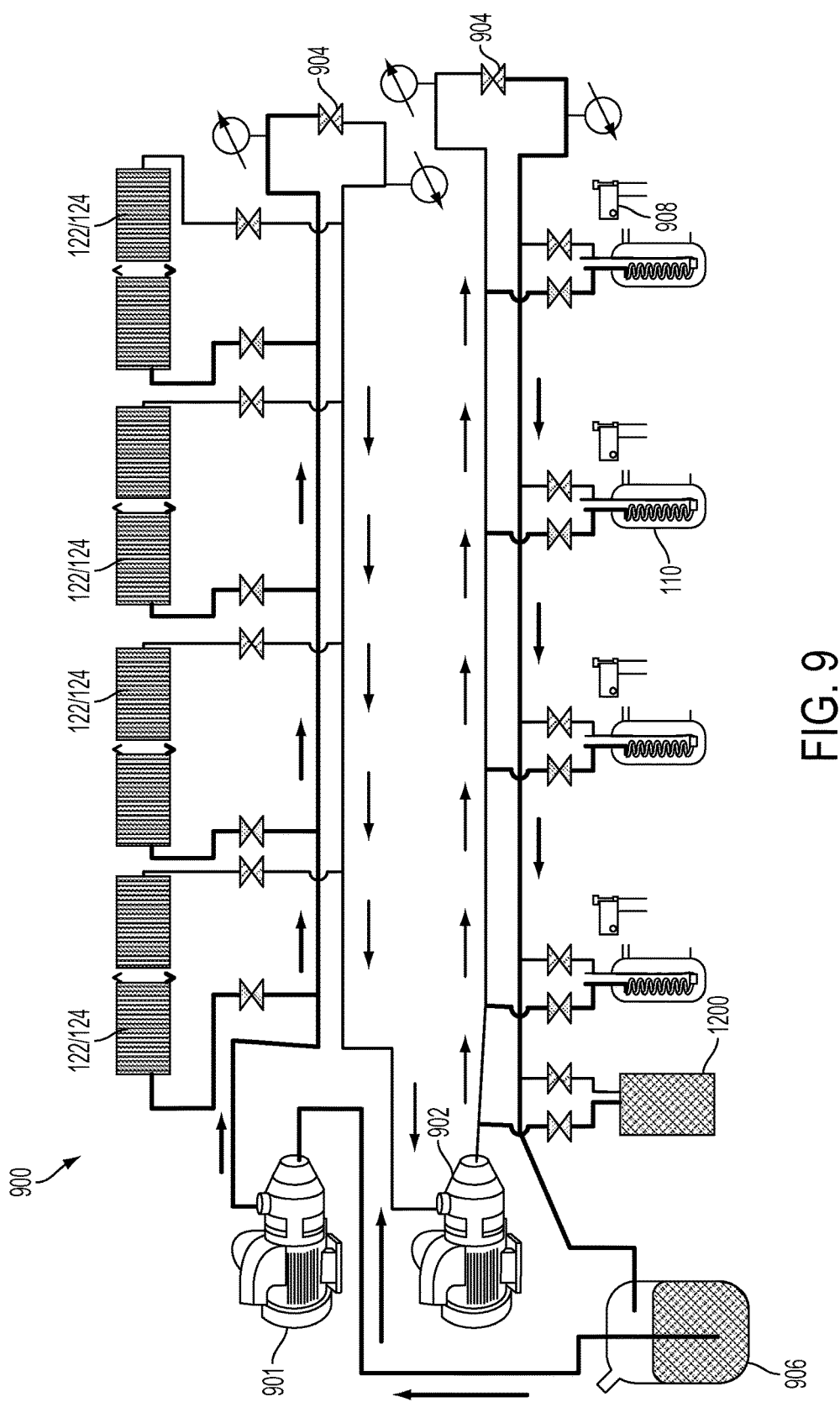
FIG. 9 illustrate a system view of a central solar water heating system for a multi-story building in accordance with an aspect of the disclosure.
Figure 10:
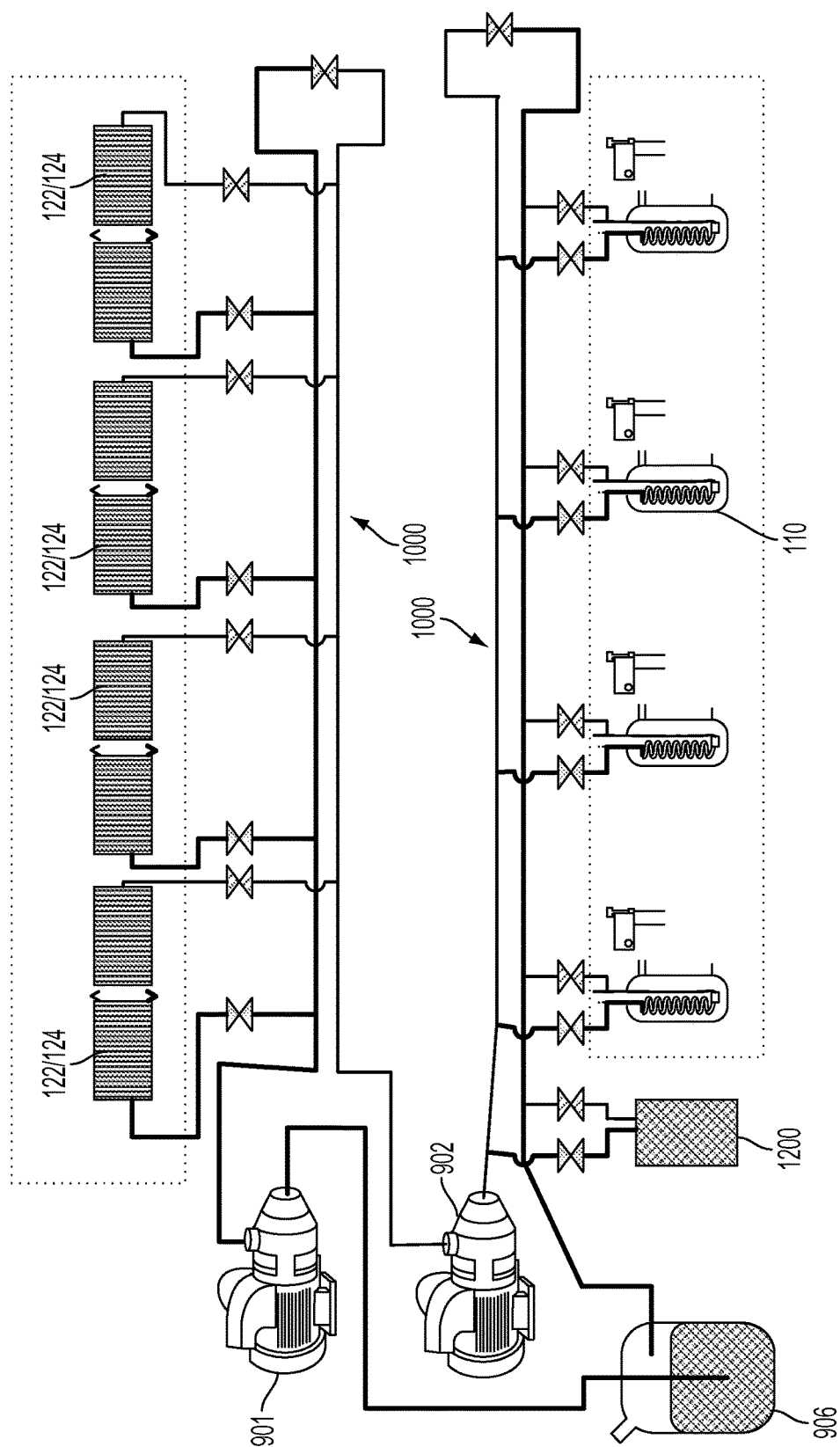
FIGS. 10 and 11 illustrate a schematic description of the central solar water heating system of FIG. 9 in accordance with an aspect of the disclosure.
Figure 11:
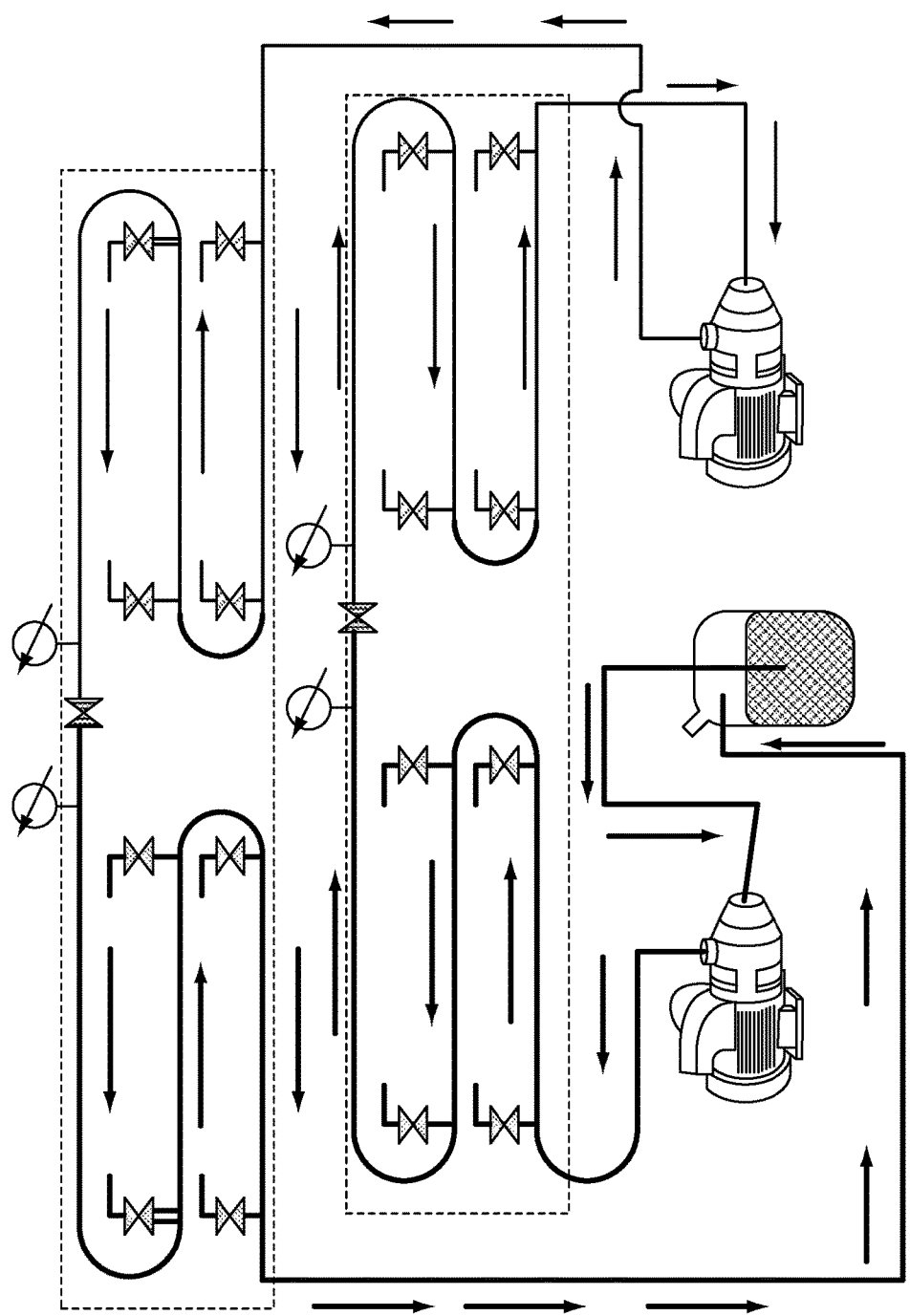
Figure 13:
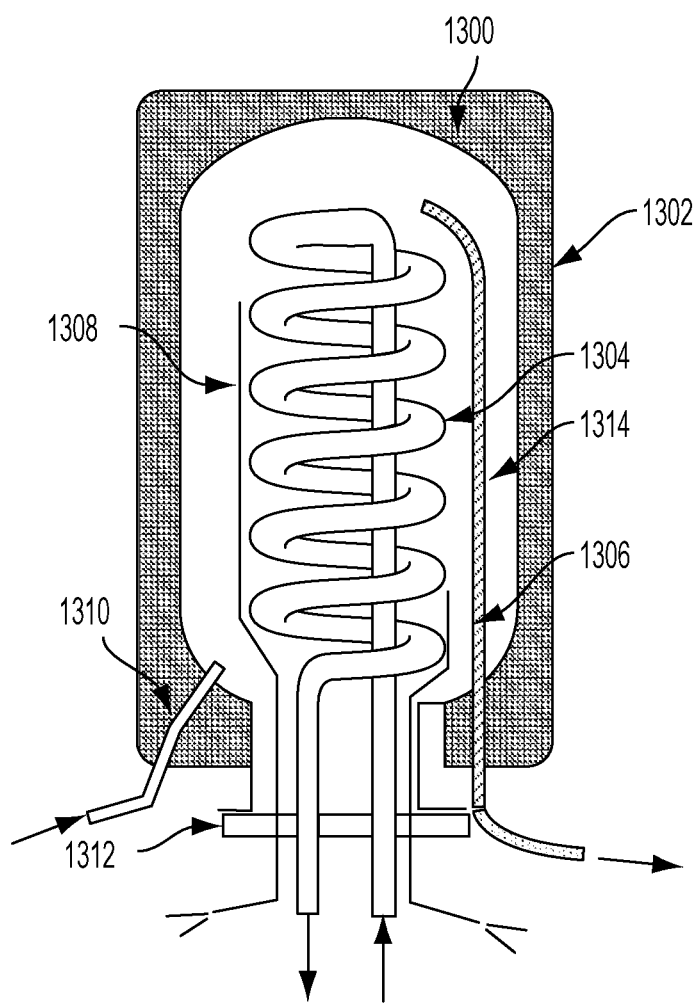
FIG. 13 illustrates a hot water storage vessel in accordance with an aspect of the disclosure.

As discussed with respect to FIG. 1B, each apartment (e.g., 102-108) may have a hot water storage vessel (e.g., 110), which may be used as a hot water storage vessel described with respect to FIG. 13. In addition each apartment may include an "on the flow" electric/gas backup heater to support the few days per year when solar heating is not sufficient. At each floor, one "fluid circulating system" (e.g., as illustrated in FIGS. 9 to 11) may be provided.

FIGS. 2-13 illustrate an apparatus in an aspect of the present disclosure.

Aspects of the present disclosure comprise one or more smaller central systems that collect the solar energy arriving to the external walls of each floor of any multi-story building, and stores it in hot water storage vessels located around the building. The vessels may be in each apartment, similar to individual hot water heaters, or may be shared between various rooms or floors as desired.

Figure 2:
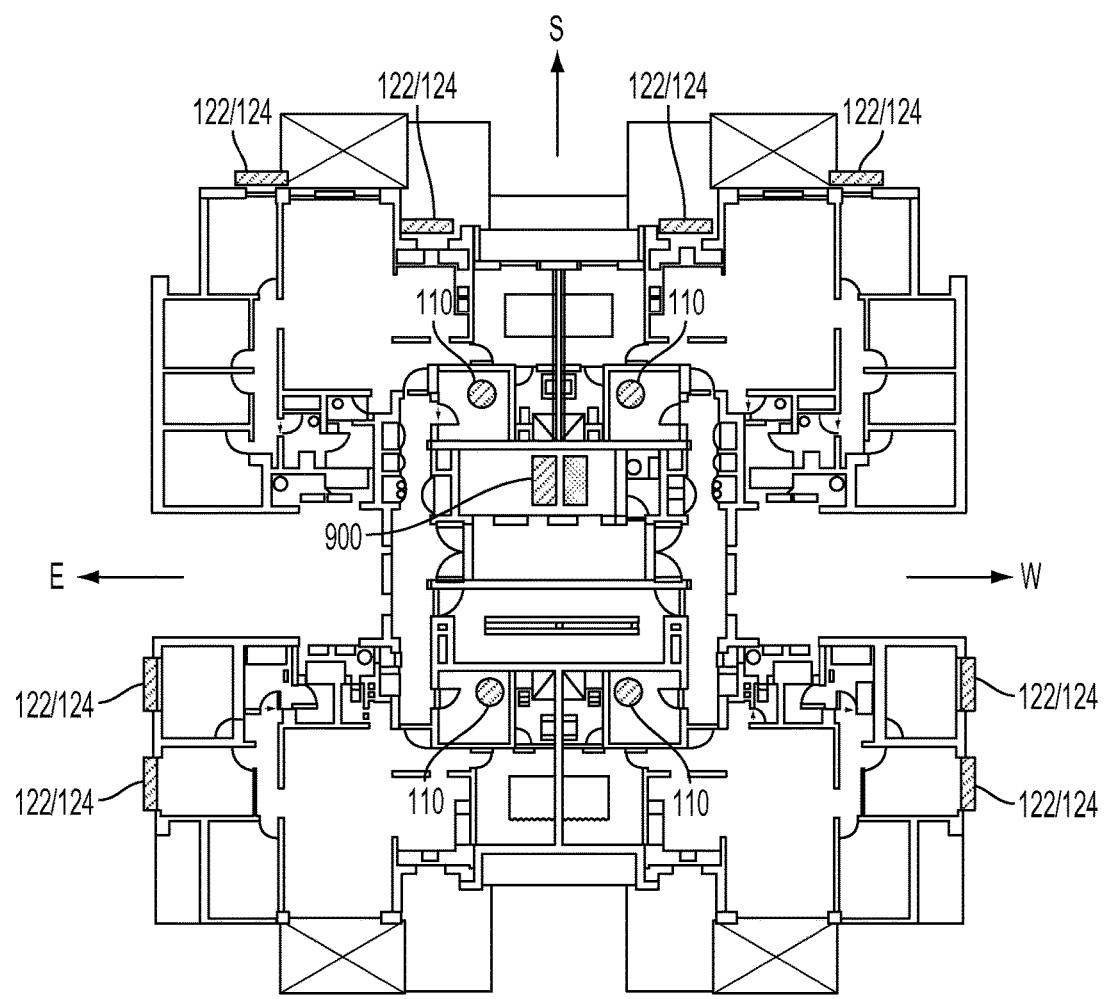
FIG. 2 is a layout of a floor of a multi-story building in accordance with an aspect of the present disclosure.

FIG. 2 illustrates a layout of a floor of a multi-story building in accordance with an aspect of the present disclosure. As shown in FIG. 2, the solar collectors 122 and/or 124 are positioned around the outside walls of the building 100, while the hot water storage vessels 110 and the system 900 are located inside the building 100. The hot water storage vessels 110 are shown as installed within each of the apartments (e.g., 102-108). As shown in FIG. 2, the solar collectors 122 and/or 124 may be positioned differently than the positions shown in FIGS. 1B-1F.

As shown in FIG. 2, the walls of building 100 that will receive solar radiation may have solar collectors 122 and/or 124 installed between the windows on each of the floors. For ease of illustration, only the floor is shown as having the solar collectors 122 and/or 124 installed; it is envisioned as within the scope of the present disclosure that any or all floors of the building 100 may have the solar collectors 122 and/or 124 installed.

FIG. 2 also illustrates that there may be the same number of solar collectors 122 and/or 124 installed in any given one of the apartments. For example, and not by way of limitation, an apartment may have more solar collectors 122, or a collection of solar collectors 122 and/or 124, installed in that particular apartment, because apartment may receive more solar radiation for conversion to thermal and/or electrical energy than other apartments in the building 100. This may be because apartment faces the proper direction, there are no shadows from other buildings blocking direct solar radiation from the apartment, or for other reasons. Further, any given one of the apartments may have one or more solar collectors 122 and one or more solar collectors 124 installed, depending on the wall space available in that apartment.

The apartments that receive less solar radiation may have fewer of the solar collectors 122 and/or 124 installed as these apartments may not have enough incident solar radiation to warrant the installation of solar collectors 122 and/or 124 to fill the space available for the solar collectors. Further, some apartments, such as those facing in directions that do not receive any directly incident solar radiation, may not have any solar collectors 122 and/or 124 installed.

In an aspect of the present disclosure, those apartments that receive more incident solar radiation may be connected to other apartments that do not receive sufficient solar radiation such that the solar radiation between the apartments is shared for electrical generation and thermal transmission. Apartments may share the thermal and electrical generation capabilities with other apartments through coupling of the thermal receiving material (e.g., water, oil, or other fluid or material) and may also share the electrical generation properties of the larger ones of the solar collectors 122 (e.g., through transmission of electrical power from one apartment to another apartment).

TABLE 1

Storage Vessels per Apartment

| Number of apartments per floor | Number of vessels |
|---|---|
| 4 | 1 |
| 6 | 2 |
| 8 | 2 |
| 10 | 3 |
| 12 | 3 |

The system may include one hot water storage vessel per apartment The system is a modular central system that can be fitted in any combination of number of apartments per floor. Table 1 provides a guideline for the number of hot water vessel per apartment, assuming a minimum for apartments. When the number of apartments involves more than one module, an additional circulating system may be supplied to circulate the heating fluid between modules to share the heat energy evenly between all the hot water storage vessels fitted in each apartment of a particular floor.

Figure 3:
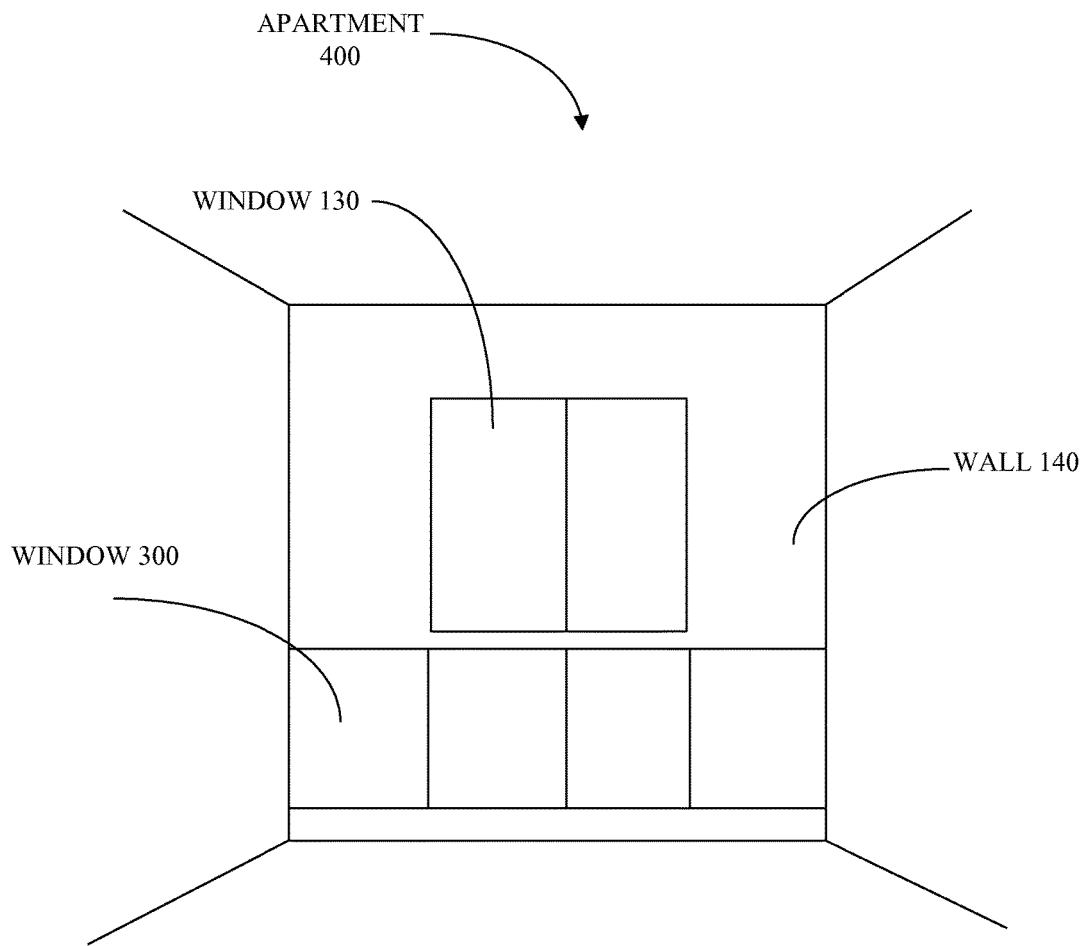
FIG. 3 illustrates an interior view of an apartment in accordance with the related art.

FIG. 3 illustrates an interior view of an apartment 400 in accordance with the related art. From the inside of an apartment in the building 100 (e.g., apartment 400) the windows 130 and the optional windows 300 are present in the wall 140. The optional windows 300 may be present in the wall 140 between one of the windows 130 and a floor of the apartment 400.

Figure 4:
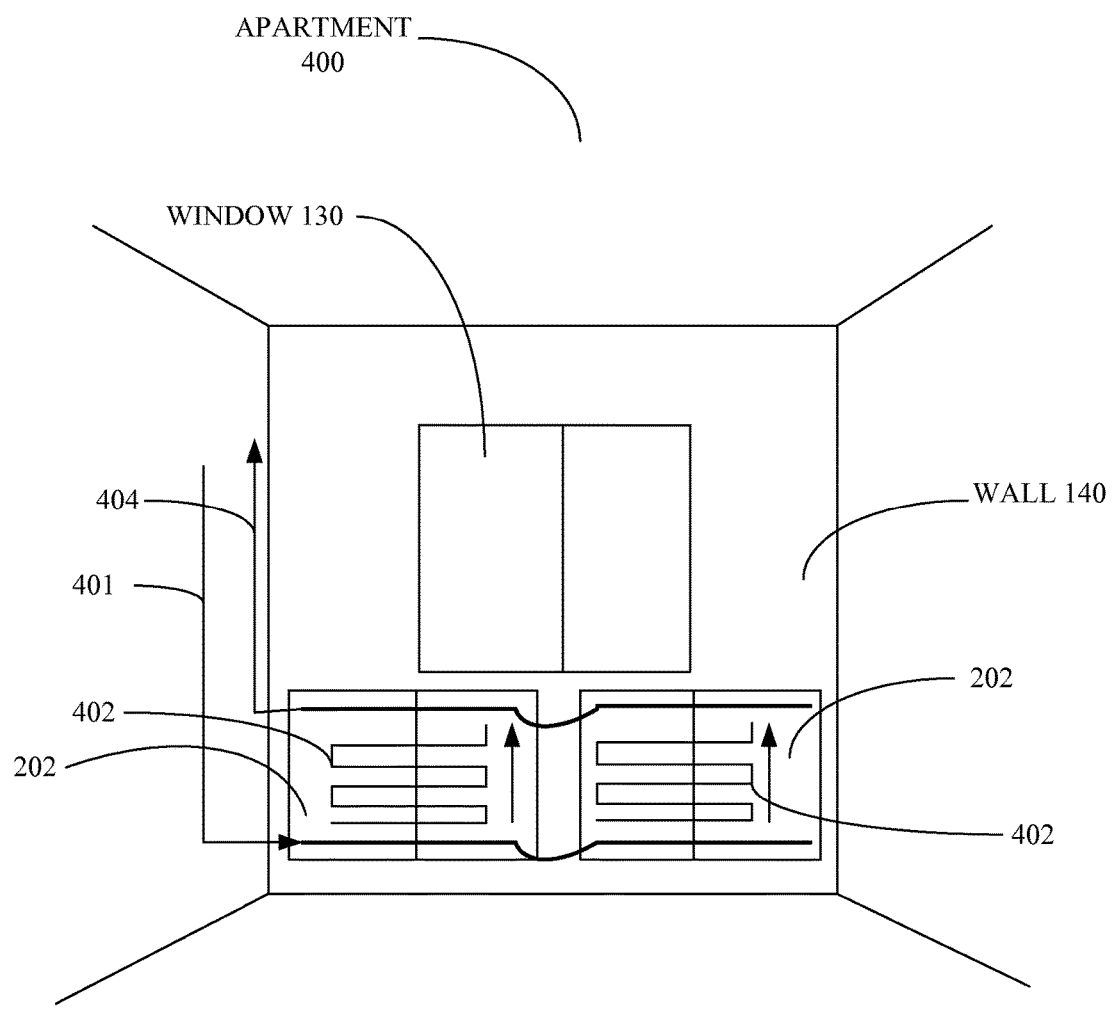
FIG. 4 illustrates an interior view of a room with a first type of solar collector in accordance with an aspect of the present disclosure.
Figure 5:
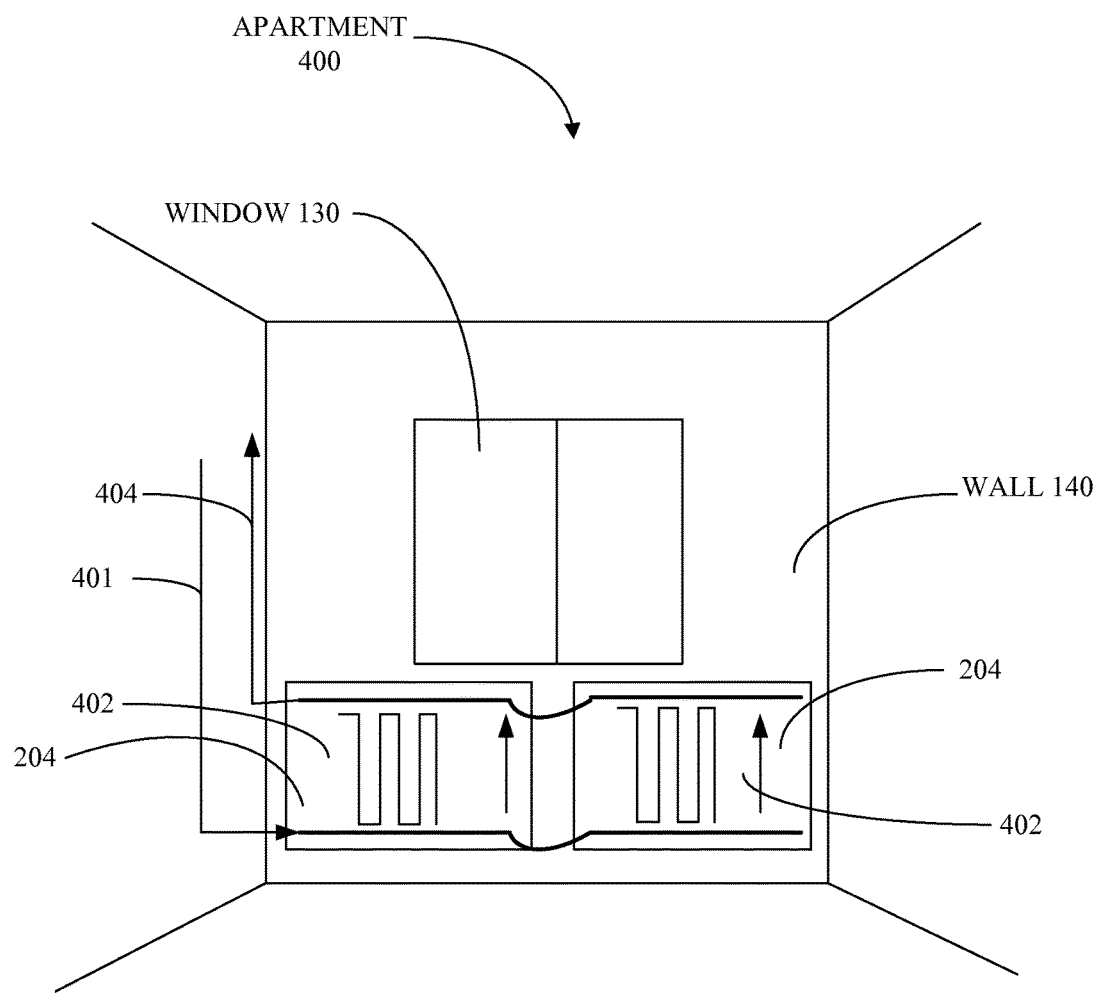
FIG. 5 illustrates an interior view of a room with a first type of solar collector in accordance with an aspect of the present disclosure.

FIGS. 4 and 5 illustrate an interior view of an apartment in accordance with an aspect of the present disclosure. In FIG. 4, solar collector(s) 202 are present between the windows 130 and a floor of the apartment 400 on the wall 140. Each of the solar collectors 202 is supplied with water from line 401, and as the water from line 401 passes through radiative elements 402, the temperature of the water increases, because the apartment 400 is receiving solar radiation from the outside. As shown in FIG. 4, the radiative elements 402 may be in a horizontal direction. As the water from line 401, which may be room temperature water or water that is of a lower temperature, passes through radiative elements 402, the water gains temperature, and passes out of one of the solar collectors 202 through line 404, which may be a hot or increased water temperature line. Arrows on the line 401 and line 404 indicate the direction of water flow through the solar collector(s) 202.

FIG. 5 illustrates the solar collectors 204, which may have radiative elements 402 (e.g., vertically-oriented). Other orientations of radiative elements are possible within the scope of the present disclosure. In one configuration, a central solar water heating system is composed of two internal components of a first type (e.g., FIG. 4) or a second type (e.g., FIG. 5) of solar water heather positioned behind a specially designed fixed pane windows (e.g., with dimension of: a 3 meter width, a 1.2 meter height and positioned at 0.07 meters above the floor in some of the external walls facing: East, South and West), as shown in FIGS. 4 and 5. This setup may be provided per each apartment in a particular floor.

Figure 6:
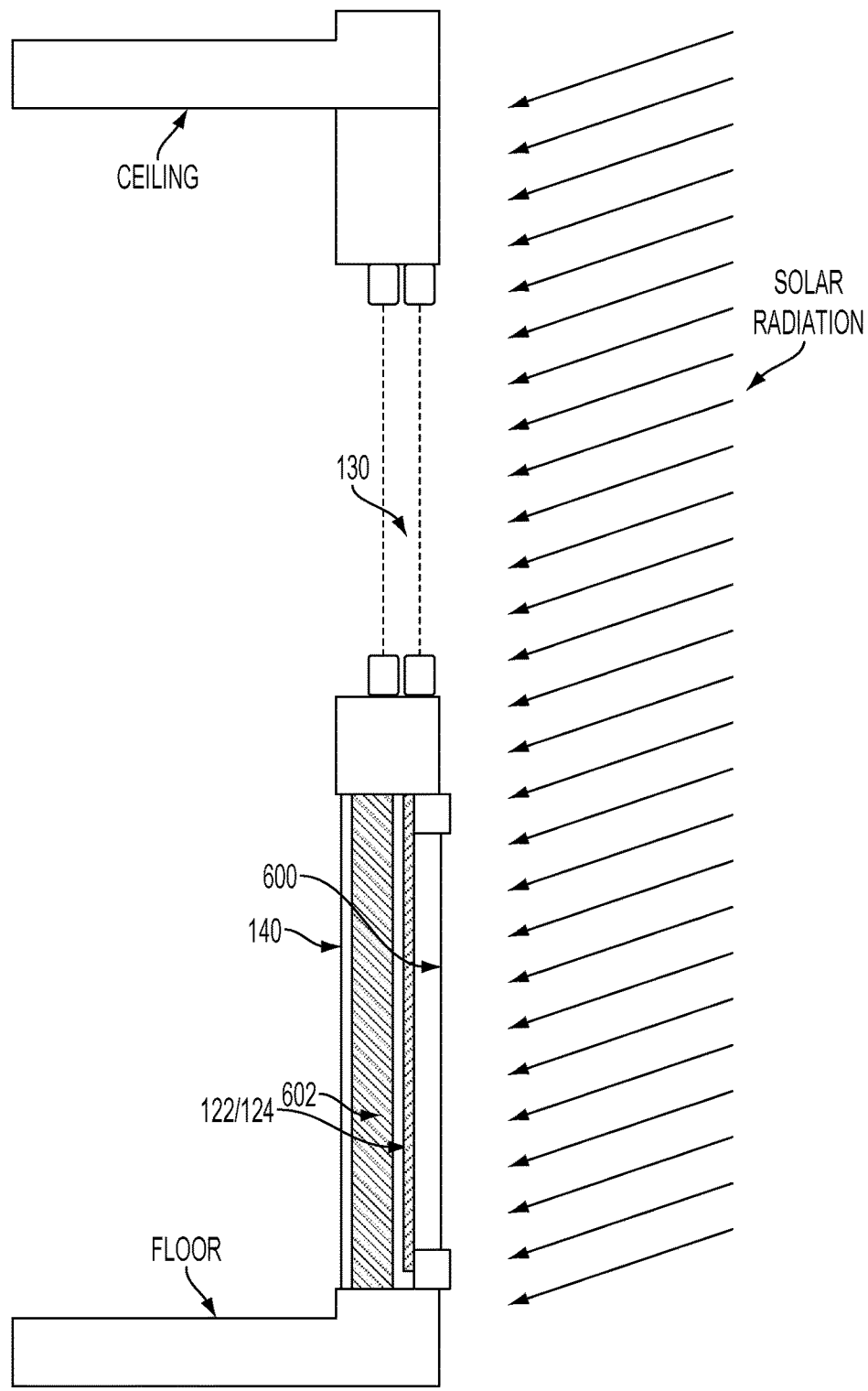
FIG. 6 illustrates a cutaway view of a wall in accordance with an aspect of the present disclosure.

FIG. 6 illustrates a cutaway view of an apartment in accordance with an aspect of the present disclosure. One of the windows 130 is shown in wall 140, with solar collector 202/204 also in wall 140. The inside of wall 140, as part of solar collector 202/204, may be glass 600, or other reflective or transmissive material, to allow incident radiation to heat the water that is in the solar collector 202/204. Insulation 602 improves the thermal transfer within the solar collector 202/204, and also assists the wall 140 in maintaining a desired temperature within the apartment.

Figure 7B:
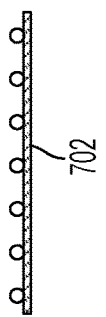
FIG. 7 illustrates a detailed view of a first type of solar collector in accordance with an aspect of the present disclosure.
Figure 7A:
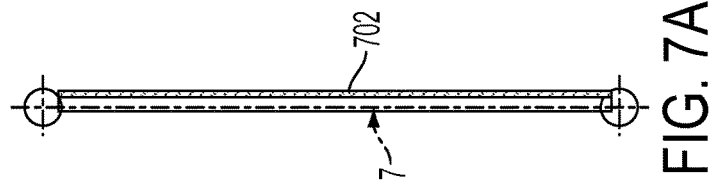
Figure 7:
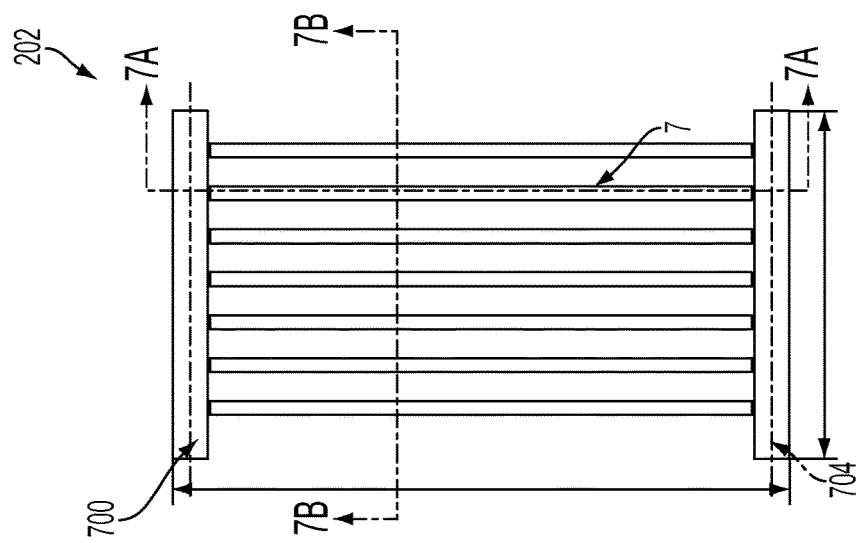

FIG. 7 illustrates detailed views of the solar collectors 202 in accordance with an aspect of the present disclosure. The "hot" tube collector 700, as part of the solar collectors 202, collects the heated water in one of the solar collectors 202 and passes the heated water to line 404. The radiative elements 402 are coupled to a heat absorbing plate 702 such that incident radiation may be thermally transferred to the radiative elements 402, and thus the water in the radiative elements 402. The "cold" tube collector 704 is coupled to the line 401, where colder water enters one of the solar collectors 202.

FIG. 8 illustrates detailed views of one of the solar collectors 204 in accordance with an aspect of the present disclosure. The "hot" tube collector 700, as part of one of the solar collectors 204, collects the heated water in one of the solar collectors 204 and passes the heated water to line 404. The radiative elements 402 are coupled to a heat absorbing plate 702 such that incident radiation may be thermally transferred to the radiative elements 402, and thus the water in the radiative elements 402. The "cold" tube collector 704 is coupled to the line 401, where colder water enters one of the solar collectors 204.

In an aspect of the present disclosure, as shown in FIGS. 4-7, a system includes a solar collector 202/204 used as heating devices for water. The solar collectors 202/204 may be positioned behind a fixed pane window on the sunlight-receiving walls of the building 200. These walls may be located between the floor and the windows 130 of each room/apartment on a given floor of the building 200.

Aspects of the present disclosure also provide sharing of the solar energy arriving to the external walls, e.g., east, south and west walls in a Northern Hemisphere building on a building level (also referred to as a building floor) to produce hot water solar heating to all the rooms (e.g., apartments) on that floor or level.

Referring again to FIG. 2, because hot water storage vessels achieve a desired water temperature in about 2 to 5 hours, depending upon the hot water utilization and the season of the year, the average amount of sunlight available to a system in accordance with aspects of the present disclosure (e.g., 12 to 15 hours of sunlight per day) gives the system a potential for solar water heating and, possibly, electricity production. As shown in FIG. 2, the hot water storage vessels 110, which may be used to store hot water, may be positioned in several ones of the rooms on a given floor of a building, and the hot water storage vessels may be connected to each other via a common connector. The common connector may sense the temperature of the water in each of the hot water storage vessels 110, and/or may circulate the water between the hot water storage vessels 110, or transfer water from one of the hot water storage vessels 110 to another based on usage within the rooms. Further, the common connector may also have one of the hot water storage vessels 110 included, which may act as an additional hot water reservoir or may act as an overflow device for the hot water storage vessels 110. The common connector may be in a common area of the floor as desired.

The connections between the common connector and the hot water storage vessels 110 may shorten the distance between the solar collectors 122/124 and the hot water storage vessels 110, and also conceals these elements from the residents and facilitates maintenance. It also may result in cost reduction. The common connector provides sharing of the solar energy arriving to the external east, south and west walls of a typical floor to produce hot water solar heating to all the rooms in this floor and protects the solar collectors from freezing at night in the cold seasons, by supplying them small amount of heat from the storage vessels and/or from the common connector.

FIGS. 9-11 illustrate block diagrams of the components of the system 900 in accordance with an aspect of the present disclosure. As shown in FIG. 9, the solar collectors 202/204 are provided in a closed-loop system. The pump 901 pumps the heating fluid, while the pump 902 pumps the hot water throughout the system. Pressure regulating valves 904 control the pressure in the system 900, and a secondary vessel 906 is coupled to the pump 901. An on the flow electric heater 908 is coupled to the hot water storage vessels 110, and an anti-overheating device 1200 is coupled to the pump 902 to prevent overheating of the water in the hot water storage vessels 110.

FIGS. 10 and 11 depict a central solar watering heating system for a multi-story building according to an aspect of the present disclosure. In this configuration, the system is composed of three sub-systems: solar collectors units, hot water storage vessels and a fluid circulating system 1000. This unique setup provides an efficient solution for shortening the distance between the solar collectors (e.g., 122/124) and the hot water storage vessels 110, and also conceals these elements from the residents, while facilitating maintenance with reduced setup cost. This arrangement provides an even sharing of the solar energy arriving to the external: East, South and West walls of a typical floor to produce abundant hot water solar heating to all the apartments on a particular floor. In addition, this arrangement protects the solar collectors from freezing at night in the cold seasons, by supplying them small amount of heat from the storage vessels.

In one configuration, maintaining the sharing of the solar heated water is provided by introducing an additional pump and circulating system for sharing the heat. The collectors may be interconnected by insulated plastic tubes passing through the gypsum board walls, toward an insulated plastic manifold fitted in the stair case and/or elevator shaft. The internal heating coils fitted into the hot water storage vessels may also be interconnected to the insulated plastic manifold to combine them into a secondary close loop circuit actuated by a circulating pump and an auxiliary insulated tank for filing and regulating the fluid level in the close loop circuit, as shown in FIGS. 10 and 11.

FIG. 11 may be used to share energy in accordance within an aspect of the present disclosure. A water inlet provides water from the mains, or from another source such as a well, to the overall heat transfer system. As water enters one of the hot water storage vessels 110, it is stored until heated to a specific desired temperature, and may be provided to a flow heater which may additionally heat the water and provide the water to hot water supply. In a closed system, other liquid, which may be water or other heat-transferring materials, is pumped through a line in one of the hot water storage vessels 110 by a pump. This pump also pumps the fluid through line to the solar collectors 122/124, and then through line to one of the hot water storage vessels 110. As this flow of water heats up, the heat in one of the hot water storage vessels 110 may be transferred between a heat transfer coil in one of the hot water storage vessels 110 and the water from the water inlet. In an "open" system, the water from the water inlet may also be pumped through the solar collectors 122/124 and only released from one of the hot water storage vessels 110 once a certain temperature is reached. The pump may be located in a common area, or may be located near one of the hot water storage vessels 110, as desired.

FIG. 11 further illustrates the compact design of the system 900. It is estimated that the system 900 can be arranged in a cabinet having a volume less than a cubic meter. In an aspect of the present disclosure, the system 900 can be assembled in a cabinet prior to installation in the building 100 and be fully tested and full of heating fluid. Instead of solar collectors 122/124 and the hot water storage vessels 110 installed in such a system 900, tube jumpers may be connected to test the system 900. When installed in a building 100, the system 900 may be connected to solar collectors 122/124 and the hot water storage vessels 110 when the power to the system 900 is off. Heating fluid may be added to the secondary vessel 906 to fill the system 900 once all of the solar collectors 202/204 and/or the hot water storage vessels 110 are installed.

The potential size of the solar collection area may be larger than that required for solar water heating. If additional collectors are available, or the usage of water is not as much for a given day, the additional collectors may produce electricity by the Organic Rankin Cycle (ORC) Power Turbine or/and air conditioning by the "Absorbance cooling" technique. If such a technique is not available, the additional heat may be dissipated by an anti-overheating device as shown in FIG. 12.

Figure 12:
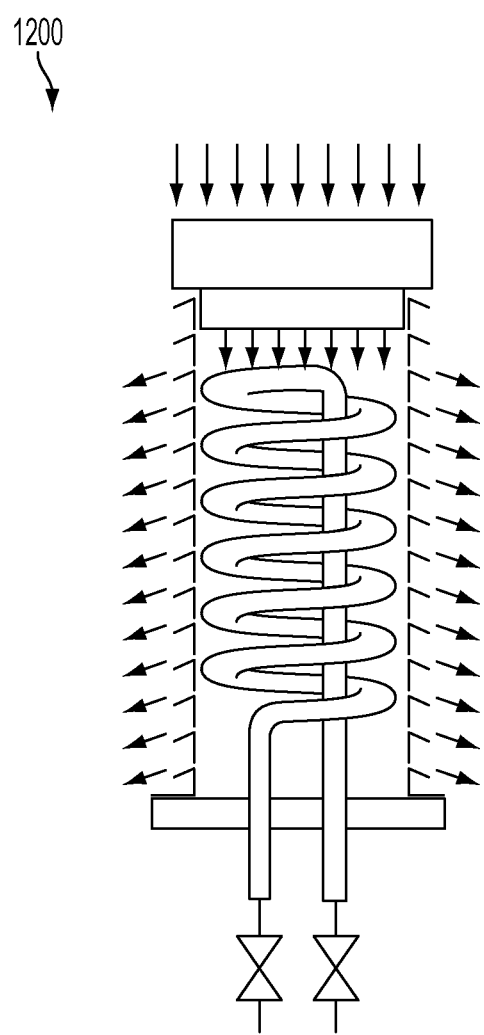
FIG. 12 illustrates an anti-overheating device in accordance with an aspect of the present disclosure.

FIG. 12 illustrates an anti-overheating device 1200 in accordance with an aspect of the present disclosure. The anti-overheating device 1200 may be similar to an automobile radiator to maintain a temperature of the water. The anti-overheating device 1200 may protect the hot water vessels (FIG. 13) from overheating. The anti-overheating device 1200 may be similar in dimension to the heating coil fitted in the hot water storage vessel, for example, as shown in FIG. 13. In one configuration, anti-overheating device 1200 is automatically connected to the hot water manifold by two electromagnet valves when the "upper temp sensor" (see FIG. 13) reaches predetermined temperature (e.g., 55° C.). At the same time, the electric fan, fitted at the top of the anti-overheating device 1200 is turned ON, and the surrounding, cool air is sucked into the anti-overheating device 1200 to cool the fluid temperature until the sensor returns to the predetermined temperature and the device is turned OFF. This setup performs as a temperature controller to keep the water temperature in all the hot water storage vessels lower than the predetermined temperature to avoid any thermal injury, particularly to children.

FIG. 13 illustrates the hot water storage vessel in accordance with an aspect of the disclosure. The hot water storage vessel 1300 contains the water, and insulation 1302 is shown as surrounding the hot water storage vessel 1300. The coil 1304 may be a bi-metallic or other heat sensitive device that will open and close the closing flange 1312 when the lower sensor 1306 and the upper sensor 1308 sense conditions that should stop or start the flow of water through the hot water storage vessel 1300. As water enters from the cold inlet 1310, the lower sensor 1306 and the upper sensor 1308 sense the temperature of the water in the hot water storage vessel 1300. If the temperature is within range, the water is passed through the hot water storage vessel 1300 to the hot water outlet 1314. If the temperature is too hot, the coil 1304 will close the closing flange 1312 and prevent the hot water outlet 1314 from receiving any water flow. The hot water storage vessel may be protected from freezing either by an antifreeze fluid. Alternatively, the transport of heat from the collectors to the storage vessels, during day light, provides protection from freezing during sun down and night with the continuing operation of the circulating pumps from the storage vessels to the collectors.

A microprocessor-based control system can monitor the proper operation of this closed loop fluid circulating system, using incorporated physical sensors such as: pressure, temperature and fluid flow velocity sensors. These may be located in the common connector, and may be coupled to the lower sensor 1306 and the upper sensor 1308 if desired. Further, the system may report system conditions for a given room, apartment, floor, or building may be determined by the system and reported to tenants, occupants, etc., either via displays in each room, floor, or via wireless technology, phone applications, or other means.

Additional energy created by aspects of the present disclosure may be used to operate the microprocessor, as well as the pumps or other energy-consuming devices within the system described herein.

In the closed system shown in FIGS. 9-11, the hot water storage vessels 110 and solar collectors 122/124 are interconnected by a circulating hot fluid that transfers the solar energy from the solar collector to the hot water storage vessels. Because this circulating hot fluid system is operating 24 hours a day, each inhabitant in each particular floor can use more hot water than the capacity of his personal storage vessel.

As noted above, the proposed system produces more hot water during the day than specified by normal consumption. To fully utilize this hot water, one configuration connects the hot water to both the washing machine and dishwasher so that hot water can be used as needed. For example, coupling the intake of the laundry dryer to the exhaust of the anti-overheating device shown in FIG. 12 reduces the electric consumption of this device as well.

An apparatus for solar fluid heating in a multi-story building in accordance with an aspect of the present disclosure includes means for receiving thermal energy installed in solar-facing (e.g., vertical) walls of the multi-story building, in which fluid receives a solar energy from the plurality of solar collectors. The receiving means may be the solar collectors 122/124 as shown in FIGS. 9-11. Such an apparatus also includes means for transferring the solar energy as thermal energy through a heating fluid. The transferring means may be the hot water storage vessels 110 as shown in FIG. 13. The apparatus also includes means for circulating the heated fluid between the plurality of solar collectors and a plurality of fluid storage vessels on a floor of the multi-story building. The circulating means may be the pump 901 as shown in FIG. 9. In another aspect, the aforementioned means may be any module or any apparatus configured to perform the functions recited by the aforementioned means.

Although aspects of the present disclosure and its advantages have been described in detail, it should be understood that various changes, substitutions and alterations can be made herein without departing from the technology of the disclosure as defined by the appended claims. For example, relational terms, such as "above" and "below" are used with respect to other items in a given device. Of course, if devices are inverted because of particular applications, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core), or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system for heating a plurality of apartments in a multi-story building having at least one exterior solar-facing wall exposed to solar radiation, the system comprising:
    a solar collector disposed on the solar-facing wall and operable to transfer heat to a heating fluid in response to receiving solar radiation at the solar collector;
    a plurality of hot water vessels, each hot water vessel being operable to supply hot water to one apartment in the plurality of apartments, each hot water vessel having a respective heating coil for transferring heat to water within the vessel; and
    a fluid circulating system operable to circulate the heating fluid between the solar collector and the respective heating coils of each of the plurality of hot water vessels, the heating fluid being operable to heat water in each of the plurality of hot water vessels for suppling hot water to the associated one apartment.

2. The system of claim 1 wherein the apartment comprises one of:
    a single room; and
    a plurality of rooms associated with the apartment.

3. The system of claim 1 wherein the plurality of apartments are located on a single story of the multi-story building.

4. The system of claim 1 wherein the solar collector comprises a plurality of interconnected solar collectors.

5. The system of claim 4 wherein the multi-story building has a plurality of exterior solar-facing walls exposed to solar radiation, and wherein at least one of the plurality of solar collectors is disposed on each solar-facing wall.

6. The system of claim 1 wherein the fluid circulating system comprises a circulating pump for circulating the heating fluid between the solar collector and the heating coils of the plurality of hot water vessels.

7. The system of claim 6 further comprising a secondary vessel operable to provide a supply of heating fluid and wherein the circulating pump is coupled to draw fluid from the secondary vessel and wherein the fluid circulation system comprises a closed loop that returns heating fluid to the secondary vessel after circulating through the solar collector and the respective heating coils of each of the plurality of hot water vessels.

8. The system of claim 1 further comprising a controller operable to control one or more of a pressure within the fluid circulating system, a flow velocity within the fluid circulating system, and a temperature of the hot water within at least one of the hot water vessels to cause a temperature of the hot water in the hot water vessel to be maintained at a lower temperature than a predetermined maximum temperature.

9. The system of claim 8 further comprising an anti-overheating device having a coil that is operably configured to be selectively coupled to the fluid circulating system to receive a flow of heating fluid through the coil when solar radiation conditions cause overheating of the water within the hot water vessels, the coil being operable to dissipate excess heat.

10. The system of claim 9 wherein at least one of the hot water vessels comprises a temperature sensor for sensing a temperature of the hot water within the hot water vessel and wherein the anti-overheating device comprises electromagnetic valves disposed to permit heating fluid to flow through the coil for dissipating heat, the anti-overheating device being operably configured to:
   activate the electromagnetic valves; and
   permit heating fluid to flow through the coil of the anti-overheating device when the water in the hot water tank reaches a temperature that is too hot.

11. The system of claim 1 wherein each hot water vessel comprises a hot water outlet for supplying hot water to the associated apartment and wherein the hot water vessel is operably configured to prevent flow of hot water from the hot water outlet when the temperature of the water in the vessel is too hot.

12. The system of claim 1 further comprising an electrical converter operable to convert excess thermal energy into electricity, the excess thermal energy produced when solar radiation conditions cause overheating of the water within the hot water vessels.

13. A method for heating a plurality of apartments in a multi-story building having at least one exterior solar-facing wall exposed to solar radiation, the method comprising:
   receiving solar radiation at the solar collector disposed on the solar-facing wall, the solar collector being operable to transfer heat to a heating fluid; and
   circulating the heating fluid between the solar collector and respective heating coils of each of a plurality of hot water vessels, each hot water vessel being operable to transfer heat to water within the vessel to supply hot water to one apartment in the plurality of apartments.

14. The method of claim 13 wherein the solar collector comprises a plurality of solar collectors and wherein the multi-story building has a plurality of exterior solar-facing walls exposed to solar radiation, and wherein at least one of the plurality of solar collectors is disposed on each solar-facing wall.

15. The method of claim 13 further comprising controlling one or more of a pressure within the fluid circulating system, a flow velocity within the fluid circulating system, and a temperature of the hot water within at least one of the hot water vessels to cause a temperature of the hot water in the hot water vessel to be maintained at a lower temperature than a predetermined maximum temperature.

16. The method of claim 15 wherein controlling the temperature comprises causing a coil of an anti-overheating device to be selectively coupled to the fluid circulating system to receive a flow of heating fluid through the coil when solar radiation conditions cause overheating of the water within the hot water vessels, the coil being operable to dissipate excess heat.

17. The method of claim 13 wherein each hot water vessel comprises a hot water outlet for supplying hot water to the associated apartment and further comprising causing wherein the hot water vessel to prevent flow of hot water from the hot water outlet when the temperature of the water in the vessel is too hot.

18. The method of claim 13 further comprising converting excess thermal energy into electricity, the excess thermal energy produced when solar radiation conditions cause overheating of the water within the hot water vessels.

19. A system for heating a plurality of apartments in a multi-story building having at least one exterior solar-facing wall exposed to solar radiation, the system comprising:
   means for collecting solar radiation disposed on the solar-facing wall, the means for collecting solar radiation including means for transferring heat to a heating fluid; and
   means for circulating the heating fluid between the means for collecting solar radiation and respective heating coils of each of a plurality of hot water vessels, each hot water vessel being operable to transfer heat to water within the vessel to supply hot water to one apartment in the plurality of apartments.

20. The system of claim 19 wherein the means for collecting solar radiation comprises a plurality of means for collecting solar radiation and wherein the multi-story building has a plurality of exterior solar-facing walls exposed to solar radiation, and wherein at least one of the plurality of means for collecting solar radiation is disposed on each solar-facing wall.

21. The system of claim 19 wherein each hot water vessel comprises a hot water outlet for supplying hot water to the associated apartment and further comprising means for causing the hot water vessel to prevent flow of hot water from the hot water outlet when the temperature of the water in the vessel is too hot.

22. The system of claim 19 further comprising means for converting excess thermal energy into electricity, the excess thermal energy produced when solar radiation conditions cause overheating of the water within the hot water vessels.

* * * * *